April 8, 1952 W. A. ANDRES 2,591,767
PRESSURE COOKER
Filed Dec. 12, 1946 3 Sheets-Sheet 1
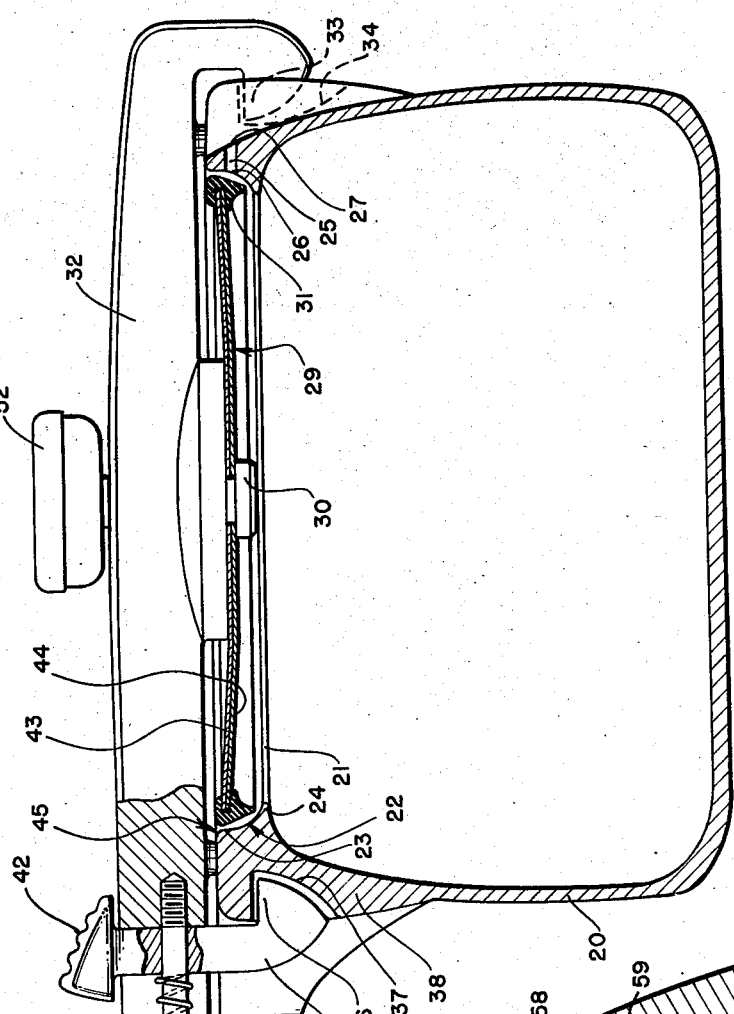
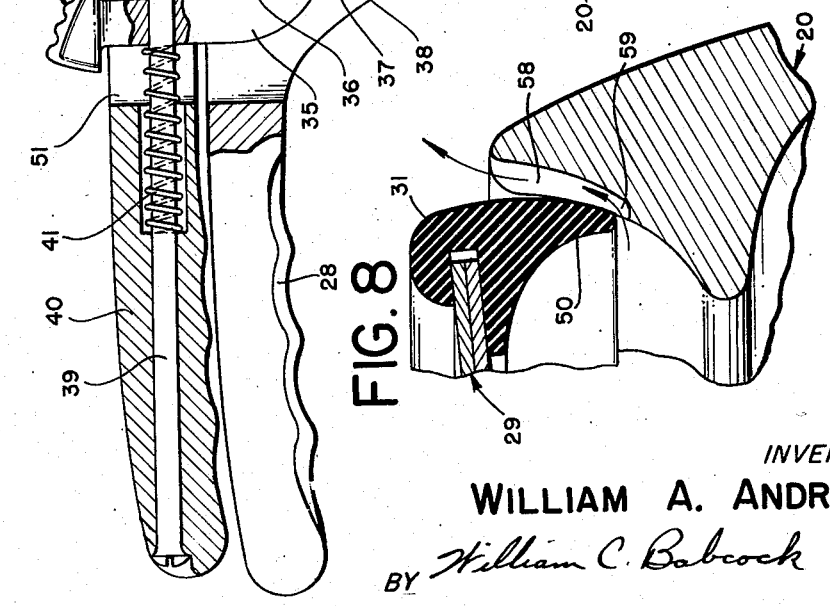
INVENTOR:-
WILLIAM A. ANDRES
BY William C. Babcock ATTY.

April 8, 1952 W. A. ANDRES 2,591,767
PRESSURE COOKER
Filed Dec. 12, 1946 3 Sheets-Sheet 2
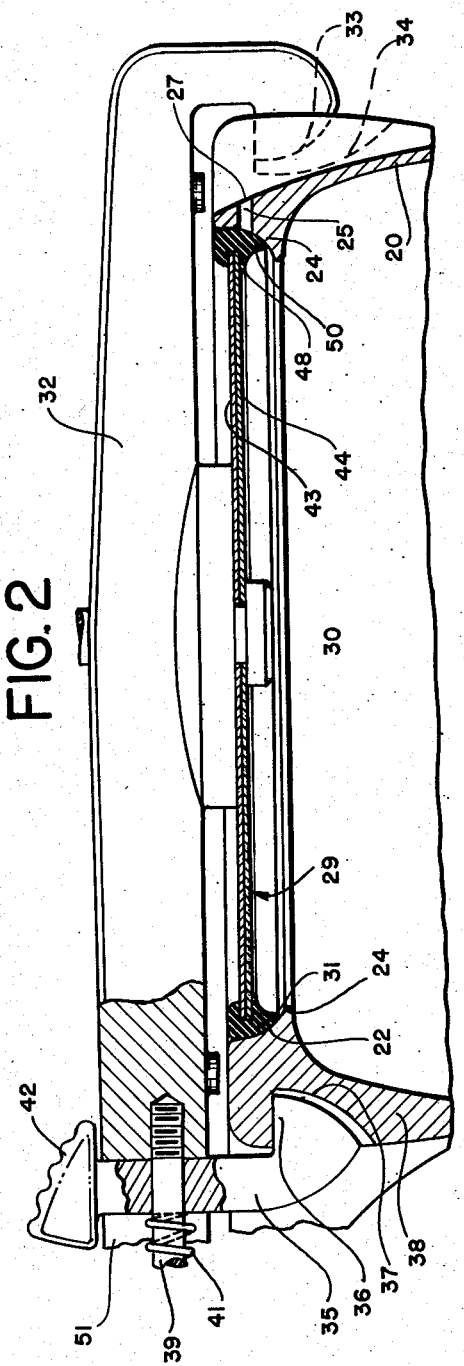
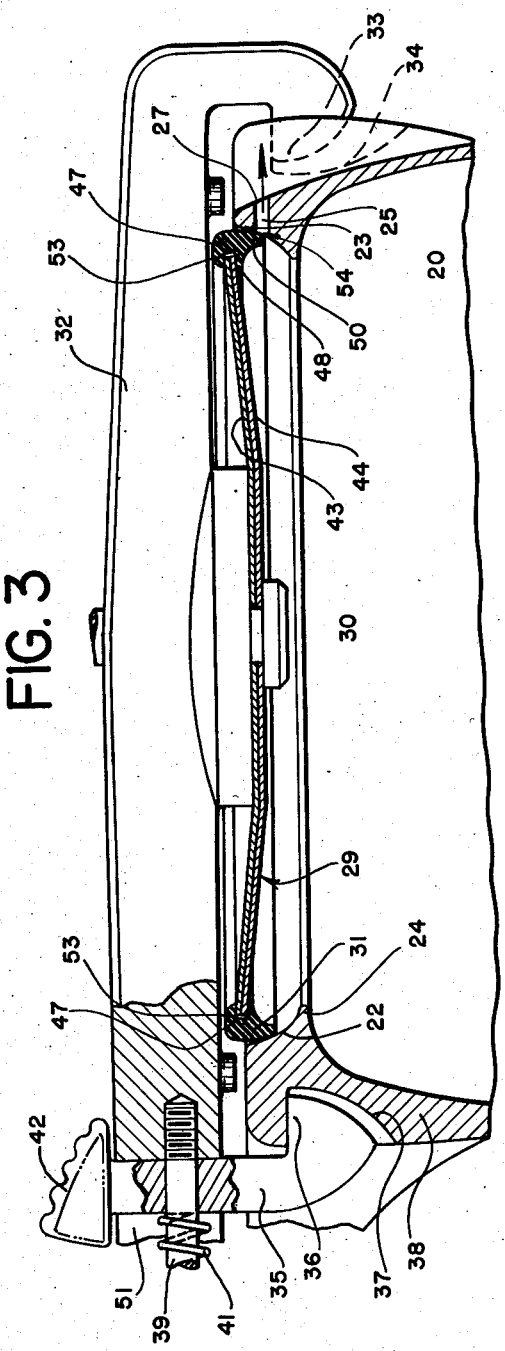
INVENTOR:-
WILLIAM A. ANDRES
BY *William C. Babcock*
ATTY.

April 8, 1952     W. A. ANDRES     2,591,767
PRESSURE COOKER

Filed Dec. 12, 1946     3 Sheets-Sheet 3

INVENTOR:-
WILLIAM A. ANDRES
BY *William C. Babcock* ATTY.

Patented Apr. 8, 1952

2,591,767

UNITED STATES PATENT OFFICE 2,591,767

PRESSURE COOKER

William A. Andres, Minneapolis, Minn., assignor to General Mills, Inc., a corporation of Delaware Application December 12, 1946, Serial No. 715,809

9 Claims. (Cl. 220—44)

The present invention involves a pressure cooker and is directed more particularly to improved means for venting excessive pressure within such a cooker.

Many constructions have been proposed in the prior art for relief of pressure and most of these involve an extra safety valve or a fusible or deformable plug which will be blown out of the cover in response to excessive pressure. Other forms of prior art construction permit venting of the excessive pressure around the edges of the cover. In these latter cases, however, it is difficult to achieve a satisfactory precision adjustment so that the venting will take place at a specified pressure. It is also difficult to obtain controlled relief of the pressure because the venting takes place throughout the circumference of the cover and completely breaks the seal between the cover and the cooker body.

It is accordingly one object of the present invention to provide a construction which overcomes these disadvantages of the prior art.

Another object is to provide a pressure cooker with pressure relief means which will respond accurately to predetermined internal pressure.

A further object of the invention is the provision of a pressure cooker with a cover, at least the edges of which are movable in response to pre-determined internal conditions of pressure, temperature, or a combination thereof, and with venting means cooperating with the movable cover to relieve such excessive internal pressure as may exist.

A still further object is the provision of means for venting excessive pressure through movement of a pressure cooker cover without breaking the sealing engagement between the cover and body.

With the foregoing objects in view, I have accordingly provided the structure exemplified in the accompanying drawings, wherein like reference characters indicate like parts and in which:

Figure 1 is a sectional view of a pressure cooker according to one embodiment of the invention;

Fig. 2 is a partial sectional view of the cooker of Fig. 1 with the cover in its initial sealing position;

Fig. 3 is a view similar to Fig. 2 but with the cover in position to permit relief of excessive internal pressure.

Fig. 8 is a partial section of still another embodiment.

Figure 4:
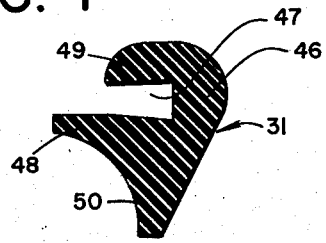
Fig. 4 is an enlarged cross-sectional view of a sealing gasket for use in the present invention.

As shown in Fig. 1, I have disclosed my invention in connection with a pressure cooker which has the usual body portion 20 of any desired shape. In the form shown, the body is substantially cylindrical with the sides of the body converging slightly toward the top. At the top of the body 20 is a circular opening 21 which is defined by the annular seat 22. This seat 22 has a relatively long curved portion as shown in the drawing and tapers from an outer portion 23 to an inner portion or shoulder 24 of substantially less diameter than the outer portion. As shown in the drawing, the upper portion 23 is almost vertical, i. e., perpendicular to the plane of the opening.

Figure 5:
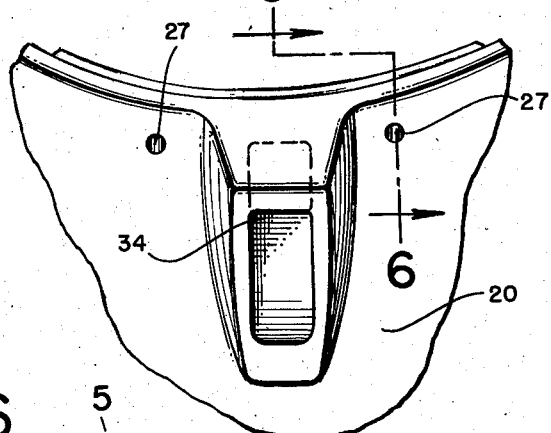
Fig. 5 is a partial perspective view of the cooker body showing details of the pressure relief openings.

At one or more points around the circumference of this seat I have provided pressure relief passages 25. In the form shown in Fig. 1, only two of such passages are employed, both of which are positioned substantially opposite the handle portion 28 of the cooker body so that steam passing through said openings will be directed away from the user. One passage is shown in the drawing immediately adjacent the near side of the locking recess 34. A similar passage is included next to the far side of this recess. (See Fig. 5.)

The inner end of passage 25 opens into the seat 22 at an intermediate portion thereof. This opening 26 is somewhere between the part 23 of greatest diameter and the portion 24 of least diameter of this annular seat. The outer end 27 of pressure relief passage 25 is open to the atmosphere as indicated above.

A cover 29 is provided for opening 21, and this cover is supported at 30 by a suitable bridge or cross-bar 32. The peripheral edge of the cover 29 carries a sealing gasket 31 which will be described in detail below. In order to control the cooking operation, a pressure gage 52 may be mounted on bridge 32. Thus, the user can adjust the heat applied to the cooker so as to maintain any desired pressure.

Bridge 32 is provided at one end with a hooked portion 33 engageable with recess 34 in the body 20. This engagement secures one end of the cross-bar in operative position.

At the other end of the cross-bar I provide a slidable latch member 35 which has a latching hook 36 adapted to engage the recess 37 in the thickened portion 38 of the cooker body. As shown in the drawing, latch 35 slides in a slot 51 in handle 40 which is an extension of the cross-bar, and the latch is further held in the slot by rod 39 which extends lengthwise through handle 40 and through the latch as shown. A spring 41 urges latch 35 toward the cooker body and into locking position. A suitable thumb piece 42 is provided on latch 35 and extends through the slot to a point above the top of handle 40 where it may be readily operated by the user.

Cover 29 may be of any desired construction adapted to flex outwardly at least at its edges in response to excessive internal pressure. As one example, I have shown my invention in connection with a bi-metallic cover which consists of two plates 43 and 44 of relatively thin material fastened together throughout their area by casting, rolling, or welding in known manner. The two plates or sheets 43 and 44 have different thermal coefficients of expansion and I prefer that the member 43 be made of brass or stainless steel while sheet 44 consists of a nickel-alloy steel of the Invar type.

In its initial or cold position, this bi-metallic cover will be in the position shown in Fig. 1. After the cooker and contents are heated, plate 43 will expand more rapidly than plate 44 and thus the edge of the cover will flex downwardly toward the inner portion 24 of seat 22. As shown in Fig. 1 there is initially a slight clearance designated as 45 between the cover edge gasket 31 and the widest portion 23 of seat 22. The presence of this gap will permit venting of air during the initial warm-up of the cooker.

After the cooker and contents are heated, so that the cover edge has flexed to its inner position as shown in Fig. 2, it is apparent that gasket 31 will engage the inner portion 24 of the seat to form a liquid-tight and air-tight seal.

Gasket 31, according to the present invention, consists of a main body portion 46 (see Fig. 4) provided with a notch 47 adapted to fit over the edge of cover 29. The portion 48 of the gasket which forms the edge of the notch on the inside of the cover is relatively thin and may extend inwardly towards the center of the cover farther than the portion 49 of the gasket which forms the outer edge of notch 47. The gasket is also provided with a thin, inwardly projecting flange 50 for a purpose to be described.

The entire gasket is preferably made of rubber or other resilient material. It will be compressed into tight sealing engagement with seat 22 and will flex in response to internal pressure in order to maintain the seal between the cover and the seat through substantial movement of the cover edge. I prefer to use synthetic rubber for the gasket.

Figure 6:
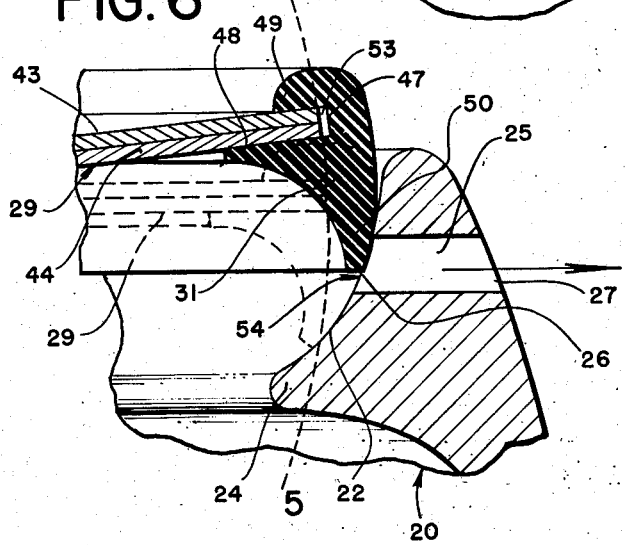
Fig. 6 is an enlarged partial sectional view along the line 6—6 of Fig. 5, which shows details of operation of the sealing gasket.

Thus, when the cover moves into the sealing position shown in Fig. 2, lips 48 and 50 of the gasket 31 will be exposed to the pressure which builds up inside the cooker. Reference to Fig. 6, in which the operation has been exaggerated slightly for the sake of clearness, will indicate that the path of movement 5—5 of the cover edge is not exactly parallel to the slope of seat 22. At the inner position of the cover (shown in dotted lines), the cover edge will be substantially closer to seat 22 than it will when the cover edge is at its outer position (shown in heavy lines). With the cover in the sealed position of Fig. 2, the gasket will fill the space between the cover edge and inner portion 24 of seat 22, with lips 48 and 50 firmly engaging the cover and the seat respectively. Increase in temperature applied to the cooker will raise the internal pressure therein to any desired degree and will further increase the sealing effect of lips 48 and 50.

In order that the structure may be perfectly safe for use, even though the user may fail to control the pressure to the desired extent, I have provided that the edge of the cover will be sufficiently flexible in response to excessive internal pressure to permit movement of the cover edge to its outer position in response to such pressure, even though the normal tendency of the bi-metallic cover 29 is to urge the cover edge into its inner position. In other words, there is a balancing of the force due to thermal flexing of the cover, by the outward force due to internal pressure. When this outward force reaches a point where further increase of pressure would be dangerous, the thermal action of the bi-metallic cover is overcome and the cover edge flexes outwardly to the position shown in Fig. 3.

Because the lip 50 is exposed to internal pressure, it will be forced against seat 22 throughout this movement of the cover edge. In other words, the seal will not be broken but will be maintained at all points around the circumference of the cover, even after the cover has moved out to expose a portion of openings 26 of passages 25. After the gasket and cover edge have moved to this position of Fig. 3, it is apparent that excessive internal pressure can be vented through the passages 25 to the outer atmosphere. As soon as sufficient pressure has been relieved by this method, the inward flexing of the cover, due to temperature, will again overcome the outward force due to internal pressure, and the cover edge will move inwardly until openings 26 are no longer in communication with the interior of the cooker. Flange or lip 50 will continue to form a tight seal throughout this return movement of the cover edge.

It will be noted that in the position of Fig. 3 with the lip 50 deformed outwardly by internal pressure to maintain its sealing engagement with the upper portion 23 of seat 22, there is a tendency to twist the entire gasket 31 and possibly force the gasket off the edge of the cover. This tendency is overcome, however, by reason of the other internal lip 48 which is also held by pressure tightly against the inner edge of the cover and which is long enough to permit substantial twisting of the gasket without becoming disengaged from the cover edge. The internal pressure may also cause a slight outward stretching of the gasket to leave a space 53 (Fig. 6) between the outer edge of the cover and the inner edge of notch 46 of the gasket. Lips 48 and 49, however, will hold the gasket in position in spite of such stretching. From the foregoing description, it will be apparent that operation of this cooker is simple and that relief of excessive pressure is automatic. The user need only engage the cover with the cooker body by first hooking the latch 33 into recess 44 and then engaging latch 35 with recess 37. The cooker is then placed on a suitable source of heat and the heat adjusted to maintain the desired pressure. First, the air within the cooker is vented through the space 45. Then, as the temperature increases, the cover edge is flexed into the position of Fig. 2 to form an initial seal. This seal is maintained throughout operation of the cooker. Should the internal pressure become dangerously excessive, then the cover edge will be forced into the position of Fig. 3 to permit relief of the pressure through passages 25. After the pressure has been released, the cover will again flex toward the position of Fig. 2 while the lip on gasket 31 will again close and seal the passages 25.

Figure 7:
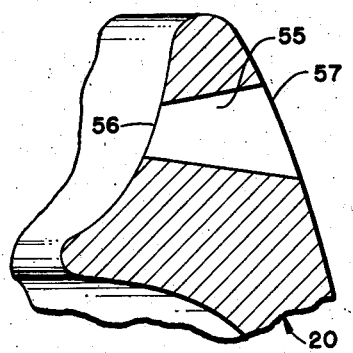
Fig. 7 is a partial sectional view of another form of pressure relief passage.

One advantage of the construction shown is that the passage 25 may serve as expansion chambers for the escaping steam. Thus, when the cover and gasket first expose openings 26, it is apparent that only the lower fraction 54 of such openings will be used. The steam which passes through these relatively small vent areas is then free to expand in the full cross section of passages 25. Again, when the steam reaches the outer ends 27 of the passages, it can expand to a further degree. I have found that there is little danger of burning the hands even at points relatively close to openings 27, and it is my belief that the lower temperature of the steam at such points is largely due to the preliminary expansion of the steam during its movement through passages 25 in the cooker body. This preliminary expansion can be further promoted by modifying the passage construction as shown in Fig. 7. In this form, passages 55 have a greater cross section at the outer ends 57 than at their inner ends 56. Thus, even though the cover gasket is raised far enough to expose the entire inner opening 56, there will still be an opportunity for the steam to expand during its progress through passages 55 before reaching the atmosphere at 57.

It is apparent that those skilled in the art will be able to change the details of construction shown in these drawings without departure from the essential invention exemplified therein. For example, instead of a bi-metallic cover, I may use any other type of cover, which is mounted for resilient movement, either as a whole or solely at its edges, in response to excessive internal pressure. Also, instead of passage 25, the annular rim or seat could be provided with a narrow notch or groove 58, as in Fig. 8, which would vent the steam pressure when the gasket moved outwardly to expose the lower portion 59 of such notch, without breaking the seal at other points around the circumference of the seat. Finally, a cover might be used in which an increase in temperature above the normal cooking range would cause an outward thermal flexing of the cover edge, particularly since it is well known that temperature and pressure are definitely correlated in closed vessels of this type.

Now, therefore, I claim:

1. In a pressure cooker having a body provided with an opening therein and a cover for said opening adapted to flex outwardly at its edges in response to excessive internal pressure, the combination which comprises an annular seat surrounding said opening and having a portion of decreasing diameter toward the inside of said body, said seat also having a pressure relief passage at an intermediate portion thereof, and a sealing member on said cover edge having an inwardly projecting resiliently flexible peripheral flange initially engageable with a portion of said seat inside said relief passage and exposed to pressure within the cooker, said flange being held in sealing engagement with said seat by said pressure throughout the outward flexing of said cover to permit relief of excessive internal pressure through said passage and the return flexing of said cover after said pressure has been relieved.

2. A pressure cooker comprising a body having an opening therein, an annular seat surrounding said opening and having a relatively long portion substantially perpendicular to the plane of said opening, said seat also having a pressure relief passage at an intermediate point on said long portion, a cover for said opening having edges outwardly movable in response to pre-determined pressure within the cooker, and a sealing gasket on said cover edges including a resilient peripheral internal lip initially engageable with said seat at a point inside said relief passage to form an air-tight seal and held against said seat by internal pressure regardless of outward movement of said cover edges beyond said relief passage in response to said pre-determined pressure, whereby excessive pressure is vented through said relief passage without disengagement of said peripheral lip from said seat.

3. A pressure cooker having a body provided with an opening therein, a seat surrounding said opening and having an inwardly converging wall portion with a pressure relief passage at an intermediate point thereon, a cover for the cooker having an edge which is resiliently movable from an inner to an outer position in response to excessive internal pressure, and a sealing gasket on said cover edge, said gasket having a resilient internal peripheral lip exposed to pressure within the cooker, the diameter of said cover and gasket being less than the diameter of the seat adjacent said relief passage and greater than the diameter of the innermost portion of said seat, said lip engaging said seat inside said relief passage to seal said opening when the cover edge is in its inner position, and being held in sealing engagement by pressure within the cooker throughout movement of the cover edge to its outer position, said relief passage being exposed to the interior of the cooker to vent said excessive pressure when said cover edge is in its outer position.

4. A pressure cooker having a body provided with an opening therein, a seat surrounding said opening, said seat including a pressure-relief opening therein, a cover for said cooker having a peripheral edge movable between an inner and an outer position in response to a pre-determined condition of at least one factor selected from the group consisting of temperature and pressure, and a sealing member for said cover edge having a resilient flexible lip initially engageable with said seat at a point below said relief opening and exposed to pressure within the cooker, said lip being held in sealing engagement with said seat by pressure, throughout movement of said cover edge to its outer position to expose said relief opening to the inside of said cooker without breaking said seal.

5. A pressure cooker having a body provided with an opening therein, a seat surrounding said opening, said seat including a pressure relief opening therein, a cover for said cooker having a peripheral edge movable from an inner to an outer position in response to a predetermined change of at least one factor selected from the group consisting of temperature and pressure, and a sealing member on said cover edge initially engaging said seat inwardly of said relief opening to seal said body opening and movable with said cover edge to its outer position to expose said relief opening to the interior of the cooker.

6. A pressure cooker having a body provided with an opening therein; a seat surrounding said opening and having a pressure relief passage at an intermediate point thereon, said passage extending through a portion of said body and connecting said intermediate point of said seat with the air outside said body and a cover automatically movable between a first position engaging the seat inwardly of the passage at one pressure range and a second position engaging the seat outwardly of the passage at a higher pressure range.

7. A pressure cooker having a body provided with an opening therein, a seat surrounding the opening, said seat including a pressure relief opening therein, and a cover for the cooker having a sealing member normally movable back and forth between an inner and an outer position in response to predetermined changes of at least one factor selected from the group consisting of temperature and pressure, the sealing member in its inner position engaging the seat inwardly of the relief opening and in its outer position engaging the seat outwardly of the relief opening.

8. A pressure cooker having a body provided with an opening therein, a seat surrounding the opening, said seat including a relatively narrow pressure relief opening therein, and a cover for the cooker having a sealing member selectively engaging the seat inside said relief opening to seal the body opening and outside the relief opening to expose the latter to the interior of the cooker in response to a cooking condition within the cooker the sealing member being maintained in sealing engagement with the seat throughout the major portion of the circumference thereof during its selective engagement outside the relief opening.

9. A pressure cooker having a cover with first pressure relief means thereon, a body portion having a seat engaged by the cover and a pressure relief passage extending from an intermediate portion of the seat to the outside of the cooker, and second pressure relief means on the cover comprising a sealing member automatically opening and closing the passage in response to a cooking condition within the body while maintaining a seal between the cover and the remainder of the seat at all times.

WILLIAM A. ANDRES.

REFERENCES CITED

The following references are of record in the file of this patent:

UNITED STATES PATENTS

| Number | Name | Date |
|---|---|---|
| 1,627,005 | Allen | May 3, 1927 |
| 1,834,837 | Hashimoto | Dec. 1, 1931 |
| 2,399,115 | Hansen et al. | Apr. 23, 1946 |